United States Patent
Nguyen et al.

(10) Patent No.: US 10,541,725 B1
(45) Date of Patent: Jan. 21, 2020

(54) METHOD AND APPARATUS FOR PHYSICAL SECURITY OVER A POWER LINE CONNECTION

(71) Applicant: The Boeing Company, Chicago, IL (US)

(72) Inventors: Nha Thanh Nguyen, Shoreline, WA (US); Timothy M. Mitchell, Seattle, WA (US); Anil Kumar, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/843,956

(22) Filed: Dec. 15, 2017

(51) Int. Cl.
*H04B 3/54* (2006.01)

(52) U.S. Cl.
CPC ..................... *H04B 3/54* (2013.01)

(58) Field of Classification Search
CPC .. H04B 3/54; H04B 3/542; H04B 3/58; H04L 2012/2843
See application file for complete search history.

(56) References Cited

U.S. PATENT DOCUMENTS

| | | | |
|---|---|---|---|
| 8,948,934 B2 | 2/2015 | Lee et al. | |
| 9,100,104 B2 | 8/2015 | Nguyen et al. | |
| 9,673,863 B2 | 6/2017 | Mitchell et al. | |
| 2006/0019609 A1 | 1/2006 | Finley, Jr. et al. | |
| 2008/0143491 A1* | 6/2008 | Deaver ................. | H04B 3/542 370/463 |
| 2010/0145568 A1 | 6/2010 | Watanabe | |
| 2011/0190967 A1* | 8/2011 | Burk ..................... | H04B 3/542 701/22 |
| 2013/0202018 A1* | 8/2013 | Li ......................... | H04B 3/542 375/222 |
| 2015/0180538 A1* | 6/2015 | Smith ................... | H04Q 9/00 375/257 |
| 2017/0048790 A1* | 2/2017 | Pratapa ............... | H04L 65/1016 |
| 2017/0193793 A1* | 7/2017 | Ricciuti ................ | G01R 15/18 |
| 2018/0342032 A1* | 11/2018 | Daigle ............. | G06Q 10/06395 |

FOREIGN PATENT DOCUMENTS

| | | |
|---|---|---|
| CN | 105656515 A | 6/2016 |
| EP | 1992524 A1 | 11/2008 |
| EP | 2111691 A1 | 10/2009 |
| EP | 2899943 A1 | 7/2015 |

OTHER PUBLICATIONS

Extended European Search Report regarding European Patent Application Serial No. 18210111.3-1219 / 3499733 dated Jun. 3, 2019; pp. 1-15.
European Search Report regarding European Patent Application No. 18210111.3-1219 dated Feb. 11, 2019; pp. 1-16.

* cited by examiner

*Primary Examiner* — Kevin Kim
(74) *Attorney, Agent, or Firm* — Armstrong Teasdale LLP

(57) ABSTRACT

A broadband over powerline (BPL) master control unit is provided. The BPL master control unit includes a processor, a local memory device, a first wireless transceiver, a second wireless transceiver and a powerline transceiver. The processor is configured to transmit and receive data over a power line via the powerline transceiver. The processor is further configured to receive a plurality of data via the powerline transceiver, determine whether to route the plurality of data through the first wireless transceiver or the second wireless transceiver, and transmit the plurality of data via one of the first wireless transceiver and the second wireless transceiver based on the determination.

19 Claims, 7 Drawing Sheets

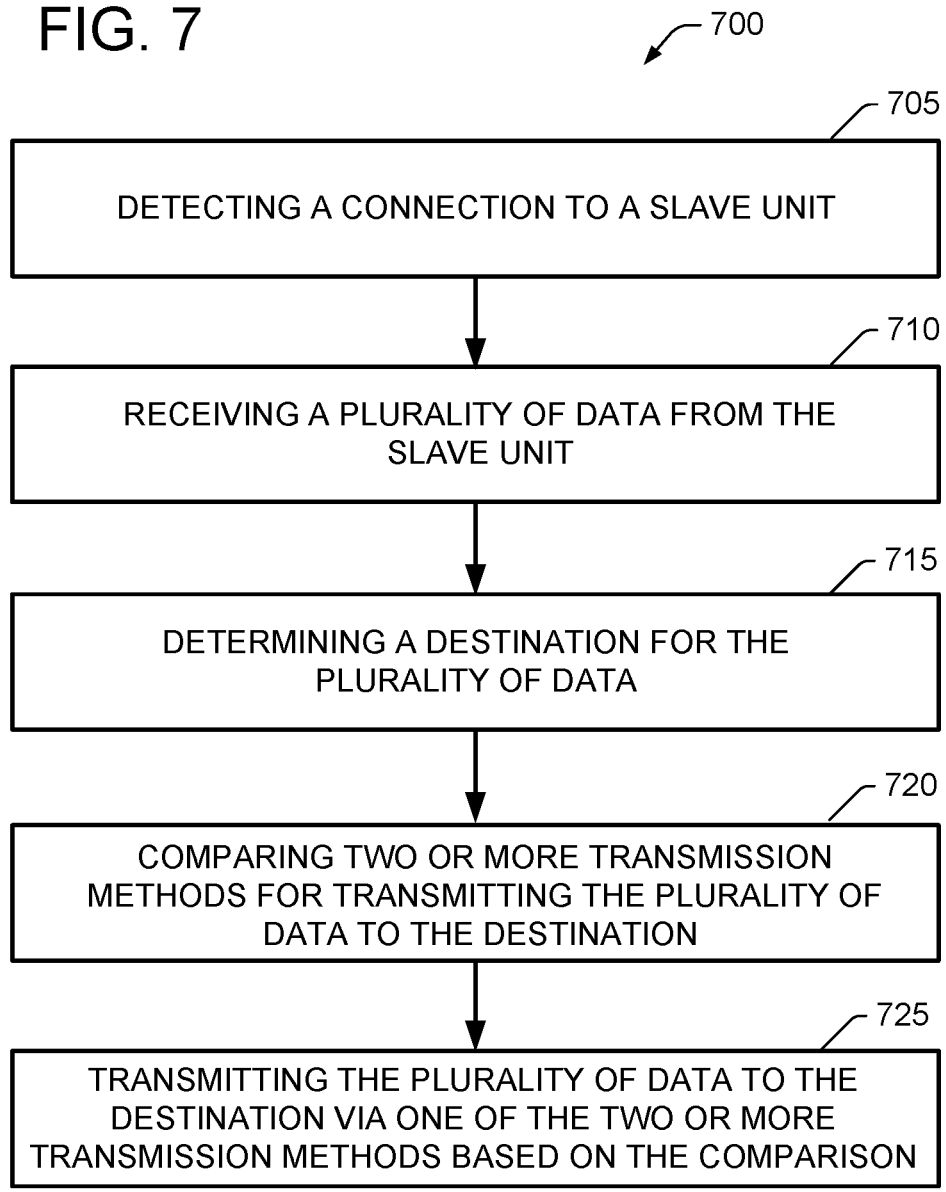

METHOD AND APPARATUS FOR PHYSICAL SECURITY OVER A POWER LINE CONNECTION

BACKGROUND

The field of the disclosure relates generally to methods and systems for secure data communication and more particularly, to methods and systems for increasing data transmission rates in communications across a three-phase power system.

Vehicles such as commercial aircraft, and the various systems thereon, generate and consume considerable amounts of data. For example, engines are monitored at every stage of operation, which results in generation of significant amounts of data. Such engine monitoring data includes, for example, but not limited to compression ratios, rotation rate (RPM), temperature, and vibration data. In addition, fuel related data, maintenance, Airplane Health Monitoring (AHM), operational information, catering data, In-flight Entertainment Equipment (IFE) updates and passenger data like duty free shopping are routinely and typically generated onboard the aircraft.

At least some of these systems wirelessly connect to a ground system through a central airplane server and central transceiver for data transmission and reception. However, certain systems are not configured for wireless transfer of data. Therefore, when an aircraft arrives at a gate, much of the data is downloaded manually from the aircraft. Specifically, data recording devices are manually coupled to interfaces on the aircraft and the data is collected from the various data generators or log books for forwarding and processing at a back office. In addition, the back office function transmits updated datasets, for example data related to a next flight(s) of the aircraft, to the aircraft.

Demand for additional communication channels and data transfer is driving rapid change in connection with such communications. Such increased demand is due, for example, to increasing reliance by ground systems upon data from the aircraft, as well as increased communication needs of the flight crew, cabin crew, and passengers. In addition, data diversity along with an increasing number of applications producing and consuming data in support of a wide range of aircraft operational and business processes puts additional demand on communications. However, many of these additional communication channels could require additional holes to be drilled into the aircraft instead of using existing resources.

BRIEF DESCRIPTION

In one aspect, a broadband over powerline (BPL) master control unit is provided. The BPL master control unit includes a processor, a local memory device in communication with the processor, a first wireless transceiver in communication with the processor, a second wireless transceiver in communication with the processor, and a powerline transceiver in communication with the processor. The processor is configured to transmit and receive data over a power line via the powerline transceiver. The processor is further configured to receive a plurality of data via the powerline transceiver, determine whether to route the plurality of data through the first wireless transceiver or the second wireless transceiver, and transmit the plurality of data via one of the first wireless transceiver and the second wireless transceiver based on the determination.

In another aspect, a BPL slave unit is provided. The BPL slave unit includes a processor, a local memory device in communication with the processor, a removable storage device in communication with the processor, and a powerline transceiver in communication with the processor. The processor is configured to transmit and receive data over a power line via the powerline transceiver. The processor is in communication with a plurality of systems. The processor is further configured to receive a plurality of data from the plurality of systems, determine whether or not the powerline transceiver is connected to a BPL master control unit, transmit, via the powerline transceiver, the plurality of data to the BPL master control unit if the powerline transceiver is connected to the BPL master control unit, and store, in the removable storage device, the plurality of data if the powerline transceiver is not connected to the BPL master control unit.

In still another aspect, a method for communicating via a BPL connection is provided. The method is implemented by a master control unit including a processor in communication with a memory. The method includes detecting, via the BPL connection, a connection to a slave unit, receiving, via the BPL connection, a plurality of data from the slave unit, determining a destination for the plurality of data, comparing two or more transmission methods for transmitting the plurality of data to the destination, and transmitting the plurality of data to the destination via one of the two or more transmission methods based on the comparison.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 7 is a flow chart of a process for communicating using the power and digital communication transmission system shown in FIGS. 1 and 4.

Figure 1:
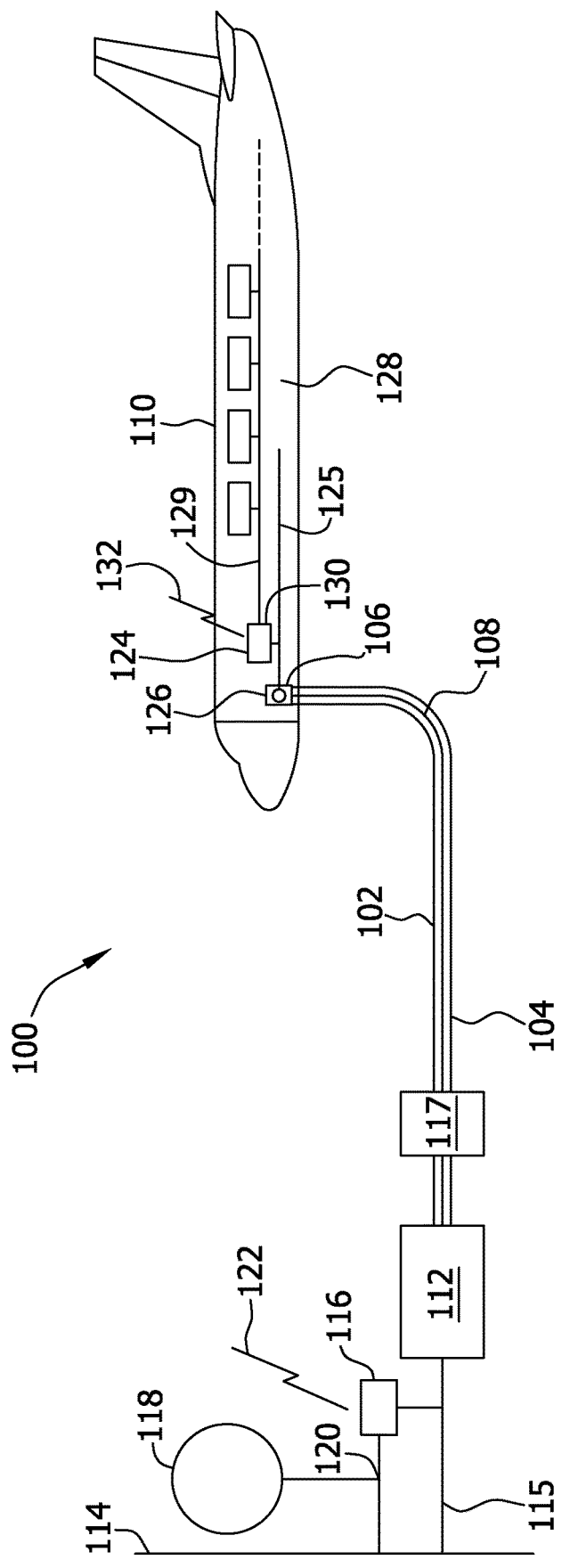
FIG. 1 illustrates a block diagram of a power and digital communication transmission system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The described embodiments enable secure vehicle broadband communication with a data network. More particularly, the present disclosure is directed to using broadband over powerline (BPL) communications to enable aircraft information exchange to occur at increased speeds and where conventional data exchange services may not be available.

Described herein are computer systems such as the BPL master and slave computer devices and related computer systems. As described herein, all such computer systems include a processor and a memory. However, any processor in a computer device referred to herein may also refer to one or more processors wherein the processor may be in one computing device or in a plurality of computing devices acting in parallel. Additionally, any memory in a computer device referred to herein may also refer to one or more memories wherein the memories may be in one computing device or in a plurality of computing devices acting in parallel.

Furthermore, while the terms "master" and "slave" are used herein to describe different computer devices, in some embodiments, this different devices may be considered more parallel devices rather than having the master device control the slave device. In some embodiments, the master device may be controlled by the slave device. For the purposes of this disclosure, the slave device is the device on the vehicle and the master device is the device on the ground or at the location that the vehicle is currently docked or stopped.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only and thus, are not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 is a block diagram of a power and digital communication transmission system 100 in accordance with an exemplary embodiment of the disclosure. In the exemplary embodiment, power and digital communication transmission system 100 includes an electrical aircraft umbilical 102 comprising a supply end 104, a plug end 106, and an electrical conductor 108 extending there between. Plug end 106 is configured to mate with a vehicle such as an aircraft 110 such that electrical power is supplied to aircraft 110 through electrical conductor 108 from supply end 104. The electrical energy used to power commercial airplanes on the ground is 115 Vac, 400 Hz, three-phase power, and includes a neutral line. In the exemplary embodiment, supply end 104 couples to a ground power system 112 at an airport terminal gate 114. Ground power system 112 is configured to receive electrical power from a power supply through a power supply conduit 115. In other embodiments, ground power system 112 is located on a pier to couple to a boat, barge, or ship (not shown). In still other embodiments, ground power system 112 is positioned at a garage or service facility and is configured to couple to a wheeled vehicle, for example, but not limited to a car, a recreational vehicle (RV), or a train. Additionally, ground power system 112 may comprise another vehicle, such as a space vehicle, undersea or sea surface vehicle wherein one or both vehicles are moving with respect to each other and/or their surroundings while coupled through umbilical 102.

Power and digital communication transmission system 100 also includes a first interface device 116 electrically coupled to supply end 104. In the exemplary embodiment, interface device 116 is electrically coupled to supply end 104 through power supply conduit 115 and ground power system 112. In an alternative embodiment, interface device 116 is electrically coupled to supply end 104 downstream of ground power system 112. In one embodiment, ground power system 112 is a distributed power system operating at voltages that are incompatible with aircraft 110. In such embodiments, a point of use power system 117 is utilized to step the voltage to a level that is compatible with aircraft 110. In another alternative embodiment, interface device 116 is electrically coupled to electrical conductor 108 internal to ground power system 112. Interface device 116 is also coupled to a network 118 through a wired network access point 120 or a wireless communication link 122.

Power and digital communication transmission system 100 also includes a second interface device 124 electrically coupled to plug end 106 when umbilical 102 is coupled to aircraft 110. In the exemplary embodiment, interface device 124 is electrically coupled to an onboard power bus 125 through plug end 106 through an umbilical plug 126 penetrating a fuselage 128 of aircraft 110. Interface device 124 is also coupled to an onboard network 129 through an onboard wired network access point 130 or an onboard wireless communication link 132. In some situations, onboard wireless link 132 may be unable to transmit from the vehicle to outside of the vehicle due to attenuation from the vehicle itself. Examiners of onboard wireless link 132 may include, but are not limited to, 60 GHz or low data rate wireless such as IoT applications over BLE, Zigbee, Wi-Fi, and Bluetooth.

First interface device 116 is configured to transmit and receive data carrier signals though electrical conductor 108 while power is supplied to aircraft 110 through electrical conductor 108. First interface device 116 is also configured to convert the data carrier signals from and to a predetermined data format on the network. Second interface device 124 is electrically coupled to plug end 106 when umbilical 102 is coupled to aircraft 110. Second interface device 124 (e.g., a receiver and a transmitter, onboard transceiver) is configured to transmit and receive the data carrier signals between first interface device 116 and onboard network 129 while power is supplied to aircraft 110 through electrical conductor 108. In the exemplary embodiment, each of first interface device 116 and second interface device 124 are configured to detect a communication link established through the electrical conductor and report the link to system 100. Interface units 116 and 124 are electrically matched with the characteristics of umbilical 102 including but not limited to wire size, shielding, length, voltage, load, frequency, and grounding.

In the exemplary embodiment, the predetermined data format is compatible with various network protocols including but not limited to, Internet network protocol, gatelink network protocol, Aeronautical Telecommunications Network (ATN) protocol, and Aircraft Communication Addressing and Reporting System (ACARS) network protocol.

In the exemplary embodiment, high-speed network service to aircraft 110 while parked in a service location such as an airport terminal gate is provided through a conductor of the aircraft ground power umbilical using for example, but not limited to Broadband over Power Line (BPL), X10, or similar technology. Use of this technology permits the airports and airlines to add a simple interface to the aircraft umbilical at the gate and for aircraft manufacturers to provide a matching interface within the aircraft to permit broadband Internet service to the aircraft through an aircraft power link in the umbilical.

Broadband over Power Line (BPL) is a technology that allows Internet data to be transmitted over power lines. (BPL is also sometimes called Power-line Communications or PLC.) Modulated radio frequency signals that include digital signals from the Internet are injected/added/modulated onto the power line using, for example, inductive or capacitive coupling. These radio frequency signals are injected into the electrical power conductor at one or more specific points. The radio frequency signals travel along the electrical power conductor to a point of use. Little, if any, modification is necessary to the umbilical to permit transmission of BPL. The frequency separation in the umbilical substantially minimizes crosstalk and/or interference between the BPL signals and other wireless services. BPL permits higher speed and more reliable Internet and data network services to the aircraft than wireless methods. Using BPL also eliminates the need to couple an additional separate cable to aircraft 110 because it combines aircraft electrical power and Internet/data services over the same wire. System 100 uses for example, an approximately 2.0 MHz to approximately 80.0 MHz frequency or X10 similar ranges with the exact frequency range use defined and engineered by the characteristics and shielding of umbilical 102 and the allowable RFI/EMI levels in that particular environment.

In an embodiment, symmetrical hi-broadband BPL is used in umbilical 102 to transmit at communication speeds with aircraft 110 at rates in the tens or hundreds of megabits per second (Mbps). Because the BPL link is dedicated to only one aircraft 110 and not shared as wireless is, actual throughput can be from two to ten times the wireless throughput in the same environment. In addition, the throughput is stable and reliable in airport environments, whereas the existing wireless Gatelink services vary with the amount of RF interference and congestion at each airport.

Figure 2:
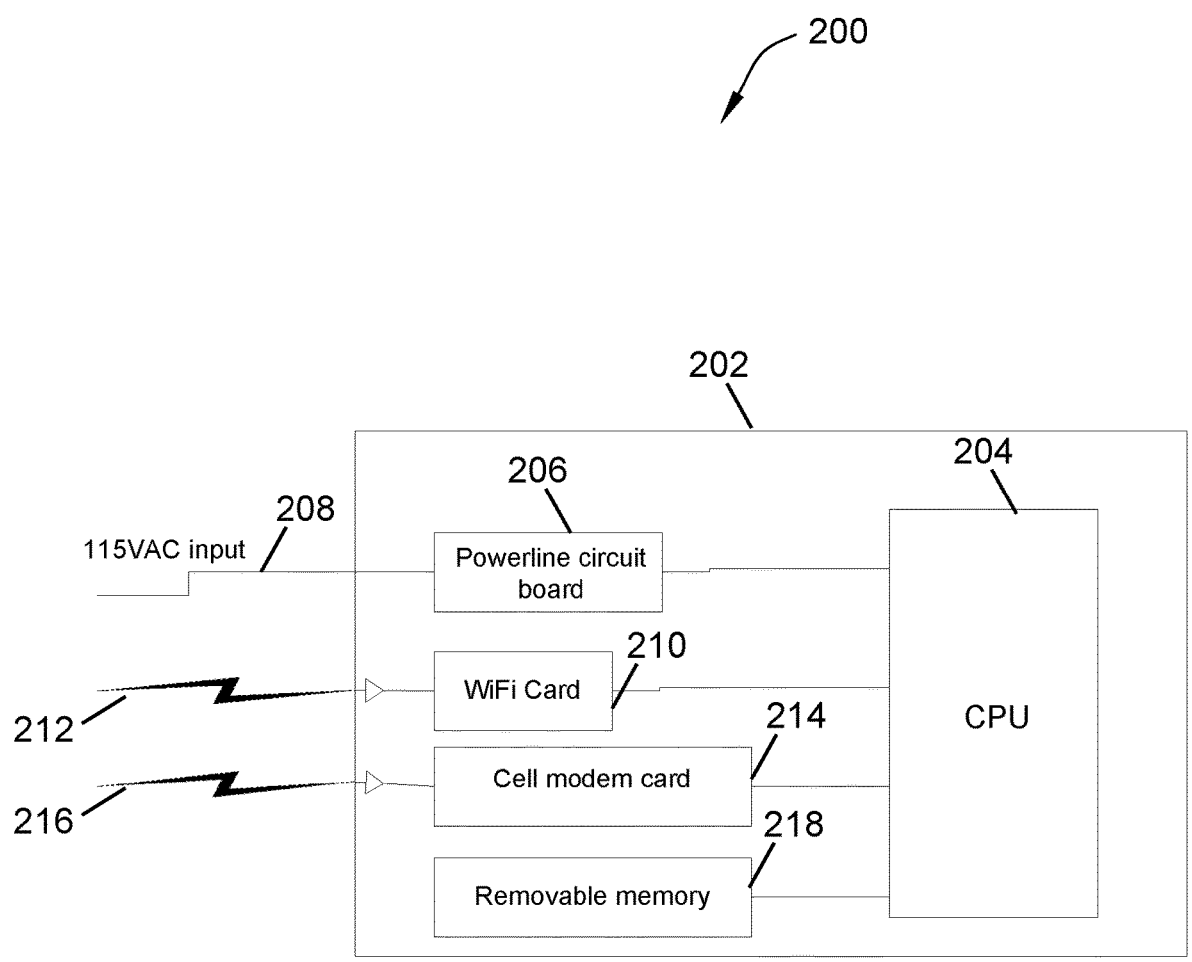
FIG. 2 illustrates a block diagram of a master control system in the power and digital communication transmission system shown in FIG. 1.

FIG. 2 illustrates a block diagram of a master control system 200 in the power and digital communication transmission system 100 shown in FIG. 1. In the exemplary embodiment, the master control system 200 includes a master control unit 202. In the exemplary embodiment, the master control unit 202 is similar to the first interface device 116 (shown in FIG. 1).

The master control unit 202 includes a central processing unit (CPU) 204 in communication with a powerline circuit board 206 (also known as a powerline transceiver). The powerline circuit board 206 allows the CPU 204 to communicate with other devices through a BPL connection 208. The BPL connection 208 uses powerlines similar to the electrical aircraft umbilical 102 (shown in FIG. 1).

The master control unit 202 also includes a Wi-Fi card 210 (also known as a Wi-Fi transceiver) for communicating with remotes devices via a first wireless connection 212. The master control unit 202 further includes a cell modem card 214 (also known as a cellular modem) for communicating with remoted devices via a second wireless connection 216. In some embodiments, master control unit 202 includes a removable memory 218. The removable memory 218 includes any memory card and device that may be removable attached to master control unit including, but not limited to, universal serial bus (USB) flash drives, external hard drives, and non-magnetic media. The CPU 204 is in communication with and in control of powerline circuit board 206, Wi-Fi card 210, cell modem card 214, and removable memory 218. While the above describes Wi-Fi and cellular connections cards 210 and 214 may also connect wirelessly through other methodologies, including, but not limited to, 60 Ghz, AeroMACS, WiMAX, Whitespace and Bluetooth.

In the exemplary embodiment, the CPU 204 detects that a connection has been made with another device over the BPL connection 208, such as to second interface device 124 (shown in FIG. 1). The CPU 204 receives a plurality of data via BPL connection 208 and the powerline transceiver 206. The CPU 204 determines a destination for the plurality of data. In some embodiments, the destination is another computer. In other embodiments, the destination is a plurality of computers or a computer network. In some embodiments, the destination is one or more computer systems associated with the airline, the airport, and/or an operations back office. The master control unit 202 is remote from the destination. In the exemplary embodiment, the master control unit 202 able to remotely connect to the destination via one or more wireless networks. In these embodiments, the CPU 204 determines whether to route the plurality of data through the first wireless transceiver (i.e., the Wi-Fi card 210) or the second wireless transceiver (i.e., the cell modem card 214). The first and second wireless transceivers may also connect using 60 Ghz, AeroMACS, WiMAX, Whitespace, and Bluetooth In some embodiments, the CPU 204 tests the signal strength of the first wireless connection 212 and the second wireless connection 216. The CPU 204 compares the signal strength of the first wireless connection 212 and the second wireless connection 216 to determine which connection to use to transmit the plurality of data to the destination. Then the CPU 204 routes the plurality of data to the destination using the determined wireless connection. In some further embodiments, master control unit 202 also considers the reliability of the first and second wireless connections 212 and 216 in determining which wireless connection to use In some embodiments, if the signal strength of the first wireless connection 212 and the second wireless connection 216 are both below corresponding predetermined thresholds, then the CPU 204 stores the plurality of data on the removable memory 218. In some further embodiments, the CPU 204 transmits the plurality of data to the destination at a subsequent time when the signal strength of one of the first wireless connection 212 and the second wireless connection 216 exceeds the respective predetermined threshold.

In some further embodiments, the CPU 204 audits the voltage, current, and phase of the BPL connection 208 to determine if the connection is within parameters. The CPU 204 may determine whether or not to transmit the plurality of data based on the audit. Furthermore, the CPU 204 may determine whether or not to receive the data over the BPL connection 208 if the CPU 204 determines that the connection is not within parameters. This ensures that the BPL connection 208 is properly connected prior to transmitting a plurality of data to ensure both the security of the connection and the integrity of the data being received by the master control unit 202.

In some further embodiments, the master control unit 202 transmits data over the BPL connection 208 to the slave unit about future aircraft operations, such as, but not limited to, software updates for one or more systems, additional movies and/or other entertainment options, flight paths, and weather information. In these embodiments, the master control unit 202 may have received the data for uploading to the slave unit from the airport, the airline, or an operations back office.

In some additional embodiments, master control unit 202 is stored on aircraft 110. When aircraft 110 lands at an airport that does not have an existing BPL system, master control unit 202 is deployed to connect to one or more wireless networks at the airport. In some further embodiments, the master control unit 202 is secured with a password to ensured access by authorized users.

Figure 3:
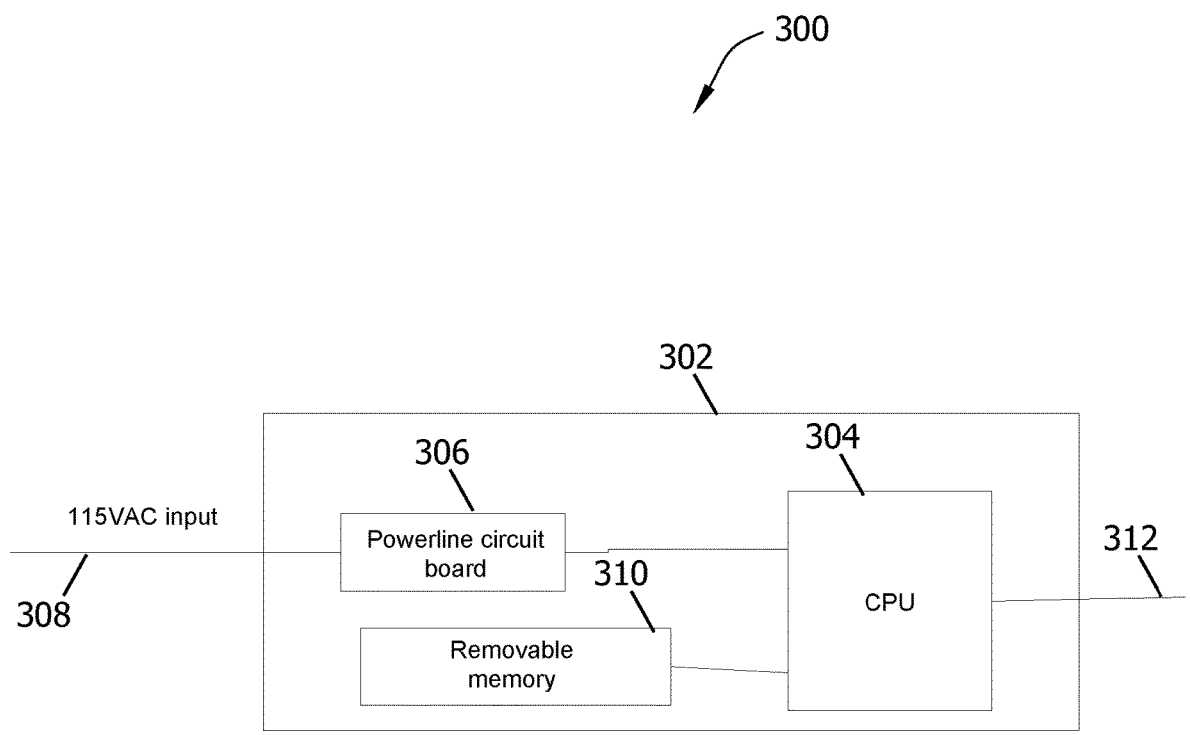
FIG. 3 illustrates a block diagram of a slave system in the power and digital communication transmission system shown in FIG. 1.

FIG. 3 illustrates a block diagram of a slave system 300 in the power and digital communication transmission system 100 shown in FIG. 1. In the exemplary embodiment, the slave system 300 includes a slave unit 302. In the exemplary embodiment, the slave unit 302 is similar to the second interface device 124 (shown in FIG. 1).

The slave unit 302 includes a central processing unit (CPU) 304 in communication with a powerline circuit board 306 (also known as a powerline transceiver). The powerline circuit board 306 allows the CPU 304 to communicate with other devices through a BPL connection 308. The BPL connection 308 uses powerlines similar to the electrical aircraft umbilical 102 (shown in FIG. 1).

In some embodiments, the slave unit 302 includes a removable memory 310. Removable memory 310 includes any memory card and device that may be removable attached to master control unit including, but not limited to universal serial bus (USB) flash drives, external hard drives, and non-magnetic media. CPU 304 is in communication with and in control of powerline circuit board 306 and removable memory 310. In some embodiments, slave unit 302 is aboard an aircraft 110 and has a connection 312 to a plurality of systems aboard the aircraft. In these embodiments, slave unit 302 receives data from the plurality of systems about the operation of the aircraft.

In the exemplary embodiment, the CPU 304 receives a plurality of data from the plurality of systems over connection 312. The CPU 304 determines whether a connection has been made with another device over the BPL connection 308, such as to master control unit 202 (shown in FIG. 2). If a connection has been made, the CPU 304 transmits, via the powerline transceiver 306, the plurality of data to the BPL master control unit 202. If there is no connection, the CPU 304 stores the plurality of data in the removable memory 310.

In some embodiments, the CPU 304 determines if the aircraft 110 is on the ground prior to determining whether or not the powerline transceiver 306 is connected to the master control unit 202. In some embodiments, the CPU 304 continuously receives data from the plurality of systems. The CPU 304 stores that data in the removable memory 310. When the CPU 304 determines that the aircraft is on the ground and connected to a master control unit 202, the CPU 304 transfers the data from the removable memory 310 to the master control unit 202 via the BPL connection 308.

In some further embodiments, the CPU 304 audits the voltage, current, and phase of the BPL connection 308 to determine if the connection is within parameters. The CPU 304 may determine whether or not to transmit the plurality of data based on the audit. Furthermore, the CPU 304 may determine whether or not to receive the data over the BPL connection 308 if the CPU 304 determines that the connection is not within parameters. This ensures that the BPL connection 308 is properly made prior to transmitting a plurality of data to ensure both the security of the connection and the integrity of the data being transmitted to and received from the master control unit 202.

In some further embodiments, the master control unit 202 transmits data over the BPL connection 308 to the slave unit 302 about future aircraft operations, such as, but not limited to, software updates for one or more systems, additional movies and/or other entertainment options, flight paths, and weather information. In some embodiments, the slave unit 302 routes the data to the appropriate systems on the vehicle. In other embodiments, the slave unit 302 acts as a pass-through to the vehicle's network.

In some further embodiments, the slave unit 302 is secured with a password to ensured access by authorized users.

Figure 4:
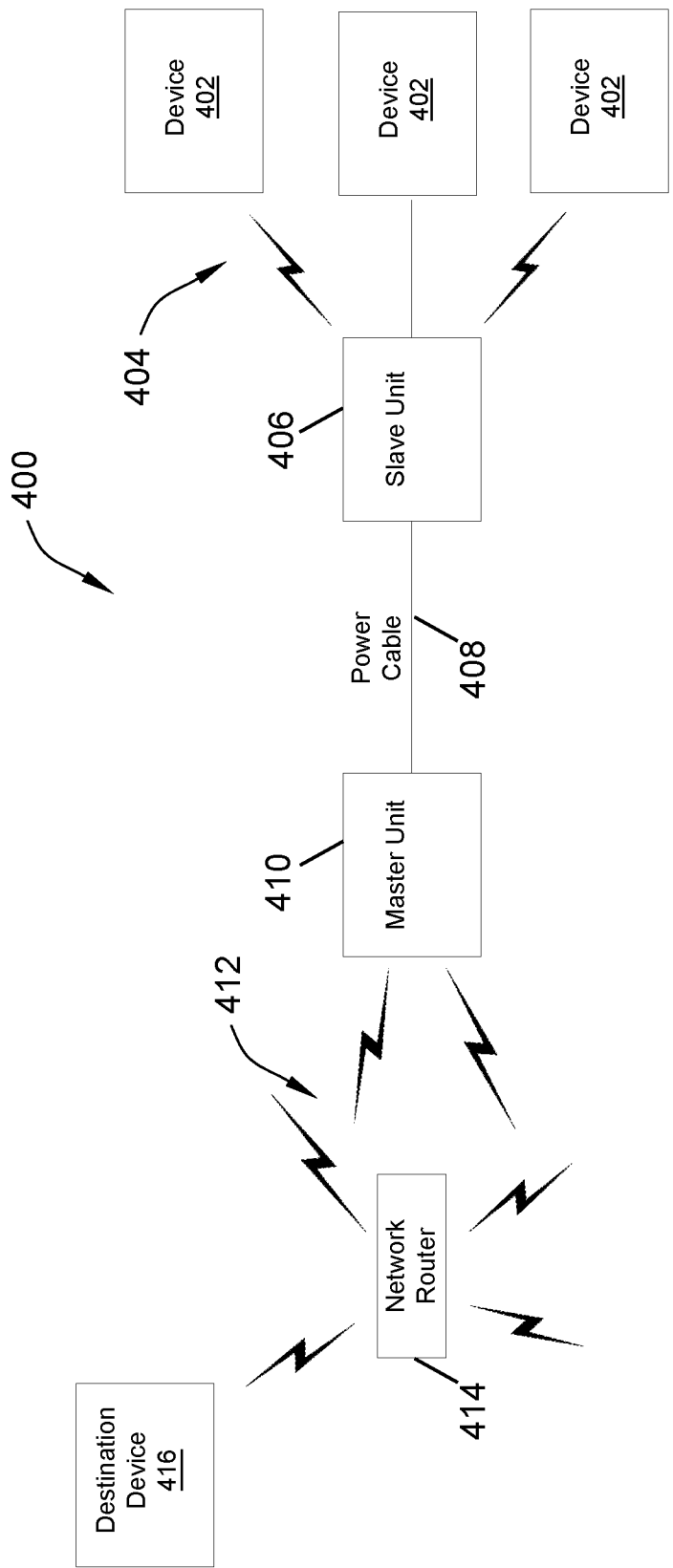
FIG. 4 illustrates a simplified flow diagram of the power and digital communication transmission system shown in FIG. 1.

FIG. 4 illustrates a simplified flow diagram 400 of the power and digital communication transmission system 100 shown in FIG. 1. In the exemplary embodiment, one or more devices 402 are in communication via a communication method 404 (such as a wired or wireless connection) to slave unit 406. The devices 402 may be one or more systems aboard a vehicle, such as aircraft 110 (shown in FIG. 1). The communication method 404 may be similar to onboard network 129 including onboard wired network access point 130 and an onboard wireless communication link 132 (all shown in FIG. 1). Slave unit 406 may be similar to slave unit 302 (shown in FIG. 3).

Devices 402 transmit a plurality of data about the operation of the vehicle to the slave unit 406. When the slave unit 406 is connected to a master unit 410 via a power cable 408, the slave unit 406 transmits the plurality of data to the master unit 410. The master unit 410 may be similar to master control unit 202 (shown in FIG. 2). The power cable 408 may be similar to the electrical aircraft umbilical 102 (shown in FIG. 1), the BPL connection 208 (shown in FIG. 2), and the BPL connection 308 (shown in FIG. 3). The master unit 410 makes a wireless connection 412 with one or more network routers 414 to transmit the plurality of data over the wireless network to its intended destination 416.

In one embodiment, devices 402 transmit a plurality of data to slave unit 406 about the operation of the vehicle. When slave unit 406 connects over a power cable 408 to master unit 410, slave unit 406 transmits the plurality of data to master unit 410. The master unit 410 attempts to connect to one or more network routers 414 using one or more wireless connection 412. The master unit 410 determines which wireless connection 412 to use based in part on the signal strength and reliability of the respective wireless connections.

The above describes transferring data from one or more device 402 on the vehicle to a destination 416 on a network 414, such as a back-office computer system. In some embodiments, the computer systems 416 on the network 414 will transmit data to be routed to one or more of the devices 402. The data may include, but is not limited to, software updates for one or more systems, additional movies and/or other entertainment options, flight paths, and weather information. In these embodiments, master unit 410 transmits the data to be upload over the power cable 408 to the slave unit 406. The slave unit 406 transmits the upload data over the Ethernet 404 to the appropriate device 402.

Figure 5:
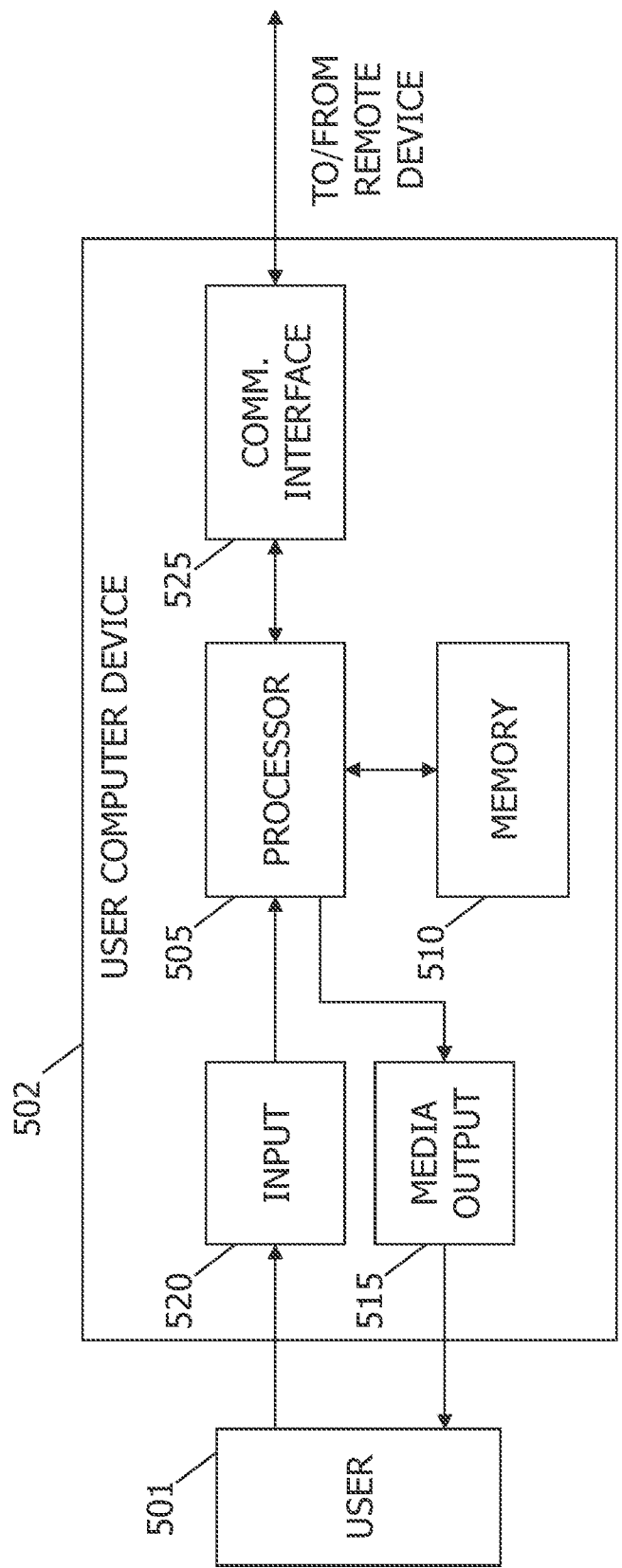
FIG. 5 illustrates an example configuration of a client system shown in FIGS. 1 and 4, in accordance with one embodiment of the present disclosure.

FIG. 5 illustrates an example configuration of a client system shown in FIGS. 1 and 4, in accordance with one embodiment of the present disclosure. User computer device 502 is operated by a user 501. User computer device 502 may include first interface device 116, second interface device 124 (both shown in FIG. 1), master control unit 202 (shown in FIG. 2), slave unit 302 (shown in FIG. 3), device 402, slave unit 406, and master unit 410 (all shown in FIG. 4). User computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or transaction data to be stored and retrieved. Memory area 510 may include one or more computer-readable media.

User computer device 502 also includes at least one media output component 515 for presenting information to user 501. Media output component 515 is any component capable of conveying information to user 501. In some embodiments, media output component 515 includes an output adapter (not shown) such as a video adapter and/or an audio adapter. An output adapter is operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 515 is configured to present a graphical user interface (e.g., a web browser and/or a client application) to user 501. A graphical user interface may include, for example, one or more settings for connecting to another device via a power cable. In some embodiments, user computer device 502 includes an input device 520 for receiving input from user 501. User 501 may use input device 520 to, without limitation, select and/or enter a setting for a network. Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as master control unit 202 or device 402. Communication interface 525 may include, for example, a wired or wireless network adapter and/or a wireless data transceiver for use with a mobile telecommunications network.

Stored in memory area 510 are, for example, computer-readable instructions for providing a user interface to user 501 via media output component 515 and, optionally, receiving and processing input from input device 520. The user interface may include, among other possibilities, a web browser and/or a client application. Web browsers enable users, such as user 501, to display and interact with media and other information typically embedded on a web page or a website from master control unit 202 or device 402. A client application allows user 501 to interact with, for example, master control unit 202 or device 402. For example, instructions may be stored by a cloud service and the output of the execution of the instructions sent to the media output component 515.

Figure 6:
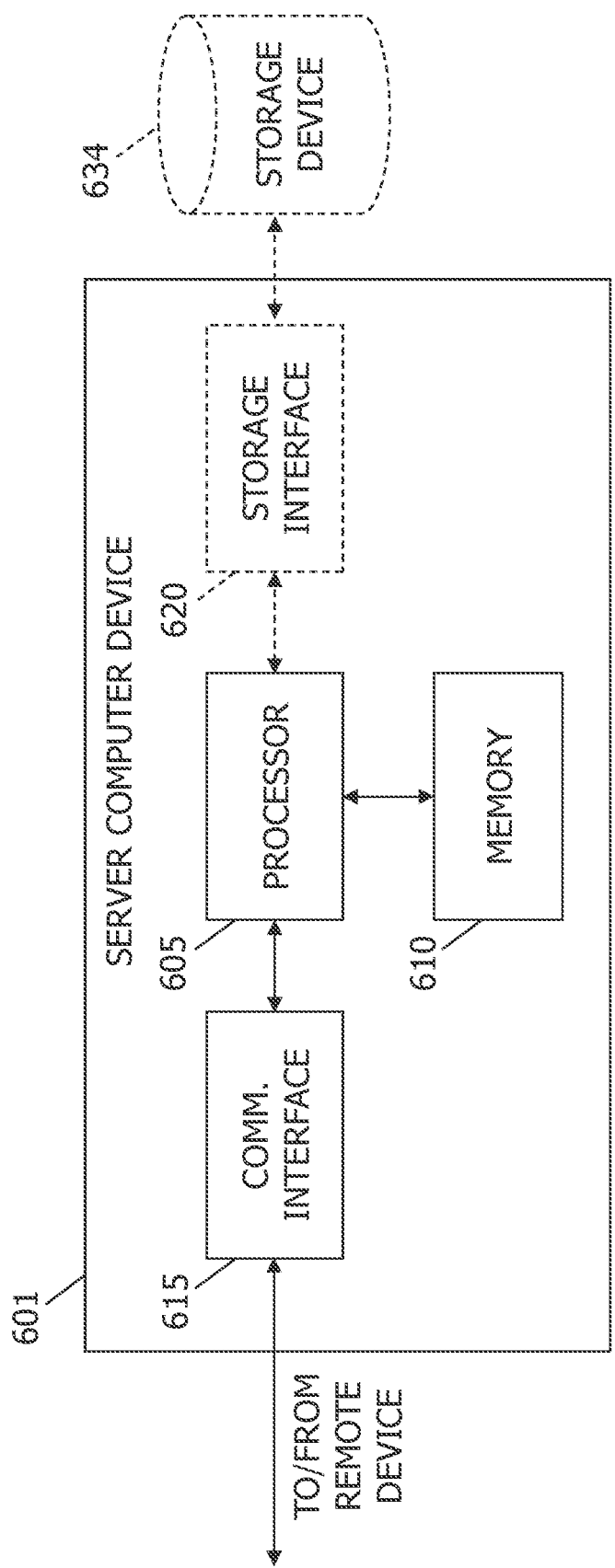
FIG. 6 illustrates an example configuration of a server system shown in FIGS. 1 and 4, in accordance with one embodiment of the present disclosure.

FIG. 6 illustrates an example configuration of a server system shown in FIGS. 1 and 4, in accordance with one embodiment of the present disclosure. Server computer device 601 may include, but is not limited to, first interface device 116, second interface device 124 (both shown in FIG. 1), master control unit 202 (shown in FIG. 2), slave unit 302 (shown in FIG. 3), slave unit 406, and master unit 410 (both shown in FIG. 4). Server computer device 601 also includes a processor 605 for executing instructions. Instructions may be stored in a memory area 610. Processor 605 may include one or more processing units (e.g., in a multi-core configuration).

Processor 605 is operatively coupled to a communication interface 615, such that server computer device 601 is capable of communicating with a remote device such as another server computer device 601, slave unit 302, network router 414, or device 402 (both shown in FIG. 4). For example, communication interface 615 may receive weather information from computer devices connected to the master control unit 202 via the Internet.

Processor 605 may also be operatively coupled to a storage device 634. Storage device 634 is any computer-operated hardware suitable for storing and/or retrieving data, such as, but not limited to, data associated with a database. In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 executes computer-executable instructions for implementing aspects of the disclosure. In some embodiments, processor 605 is transformed into a special purpose microprocessor by executing computer-executable instructions or by otherwise being programmed. For example, processor 605 is programmed with the instructions such as are illustrated below.

FIG. 7 is a flow chart of a process 700 for communicating using the power and digital communication transmission systems 100 and 400 shown in FIGS. 1 and 4. In the exemplary embodiment, process 700 is performed by master control unit 202 (shown in FIG. 2).

In the exemplary embodiment, master control unit 202 detects 705, via the BPL connection 208 (shown in FIG. 2), a connection to a slave unit 302 (shown in FIG. 3). In some embodiments, the master control unit 202 analyzes the voltage, current, and phase of the BPL connection 208 to determine if the connection is within parameters. The master control unit 202 may determine whether or not to transmit the plurality of data based on the analysis. Furthermore, the master control unit 202 may determine whether or not to receive the data over the BPL connection 208 if the master control unit 202 determines that the connection is not within parameters. This ensures that the BPL connection 208 is properly connected prior to transmitting a plurality of data to ensure both the security of the connection and the integrity of the data being received by the master control unit 202.

In the exemplary embodiment, the master control unit 202 receives 710, via the BPL connection 208, a plurality of data from the slave unit 302. In the exemplary embodiment, the plurality of data includes data from a plurality of systems that have transmitted their respective data to the slave unit 302.

In the exemplary embodiment, the master control unit 202 determines 715 a destination for the plurality of data. In some embodiments, the destination is one or more computer systems associated with the airline, the airport, and/or an operations back office.

In the exemplary embodiment, the master control unit 202 compares 720 two or more transmission methods for transmitting the plurality of data to the destination. In some embodiments, the two or more transmission methods may include a first wireless transmission method, such as the first wireless connection 212 using Wi-Fi card 210 (both shown in FIG. 2) and a second wireless transmission method, such as the second wireless connection 216 using cell modem card 214 (both shown in FIG. 2). In these embodiments, the master control unit 202 determines a first signal strength of the first wireless transmission method and a second signal strength of the second wireless transmission method. The master control unit 202 compares the first signal strength and the second signal strength to determine which wireless transmission method to use. In the exemplary embodiment, the master control unit 202 transmits 725 the plurality of data to the destination via the determined wireless transmission method based on the comparison. In some further embodiments, master control unit 202 also considers the reliability of the first and second wireless connections 212 and 216 in determining which wireless connection to use. In other embodiments, the first wireless connection 212 and the second wireless connection 216 may use one or more of 60 Ghz, AeroMACS, WiMAX, Whitespace, and Bluetooth.

In some embodiments, the master control unit 202 compares the first signal strength and the second signal strength to a corresponding predetermined threshold. If at least one of the first and second signal strength exceed the corresponding threshold, then the master control unit 202 determines which wireless transmission method to use. If neither the first nor the second signal strength exceed their corresponding threshold, the master control unit 202 stores the plurality of data in a removable storage device, such as removable memory 218 (shown in FIG. 2).

If, after beginning to transmit 725 the plurality of data over the wireless network, the master control unit 202 determines that the wireless connection has stopped or been interrupted, the master control unit 202 stores the plurality of data in the removable memory 218. In some embodiments, the master control unit 202 attempts to reconnect to the wireless network or to connect to the other wireless network.

In some embodiments, the slave unit 302 receives the plurality of data from a plurality of computer systems. In some further embodiments, the plurality of computer systems and the slave unit 302 are aboard a vehicle, such as aircraft 110 (shown in FIG. 1). In some further embodiments, the slave unit 302 determines that the aircraft 110 is in flight. When the slave unit 302 receives the plurality of data from the plurality of computer systems, the slave unit 302 stores the plurality of data in removable memory 310 (shown in FIG. 3). When the slave unit 302 determines that that the aircraft 110 is on the ground, the slave unit 302 scans to detect if there is a connection to the master control unit 202. In response to detecting the connection, the slave unit transmits, via the BPL connection 308, the plurality of data from the removable memory 308 to the master control unit 202.

Although described with respect to an aircraft broadband power line application, embodiments of the disclosure are also applicable to other vehicles such as ships, barges, and boats moored at a dock or pier and also wheeled vehicles parked in a service area.

The above-described methods and systems for transmitting power and digital communication to provide high speed Internet service support directly to the aircraft while at the gate are cost-effective, secure and highly reliable. The methods and systems include integration and use of BPL or X10 similar technology into the aircraft and airport infrastructure to support broadband Internet and data services to the aircraft with minimal infrastructure impacts and cost. The integration of BPL, X10, or similar technology into the airport and aircraft permit using the existing aircraft gate umbilical to provide the aircraft with high-speed and high reliability Internet and data services from the airport gate. Accordingly, the methods and systems facilitate transmitting power and digital communication in a secure, cost-effective, and reliable manner.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal As described above, the described embodiments enable secure vehicle broadband communication with a data network. More particularly, the present disclosure is directed to using broadband over powerline (BPL) communications to enable aircraft information exchange to occur at increased speeds and where conventional data exchange services may not be available. More specifically, a master control unit on the ground and a slave unit on the aircraft set-up a two-way communication channel over one or more powerlines and ensure the security and the integrity of the data being transferred over the powerline. The master control unit also ensures that the data is transmitted to its intended destination via the most efficient wireless network.

The above-described methods and systems for BPL communication are cost-effective, secure, and highly reliable. The methods and systems include detecting, via a BPL connection, a connection to a slave unit, receiving, via the BPL connection, a plurality of data from the slave unit, determining a destination for the plurality of data, comparing two or more transmission methods for transmitting the plurality of data to the destination, and transmitting the plurality of data to the destination via one of the two or more transmission methods based on the comparison. Accordingly, the methods and systems facilitate improving the use and efficiency of BPL communication by improving the BPL communication systems ability to communicate with outside systems that are incompatible with the 115 Vac, 400 Hz, three-phase power system.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for BPL communications. The system and methods described herein address that technical problem. The technical effect of the systems and processes described herein is achieved by performing at least one of the following steps: (a) detecting, via a BPL connection, a connection to a slave unit; (b) receiving, via the BPL connection, a plurality of data from the slave unit; (c) determining a destination for the plurality of data; (d) comparing two or more transmission methods for transmitting the plurality of data to the destination; and (e) transmitting the plurality of data to the destination via one of the two or more transmission methods based on the comparison. The resulting technical effect is communicating between BPL systems and other computer systems based on wireless communication bridges.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A broadband over powerline (BPL) master control unit comprising:
   a processor;
   a local memory device in communication with the processor;
   a first wireless transceiver in communication with the processor;
   a second wireless transceiver in communication with the processor; and
   a powerline transceiver in communication with the processor,
   wherein the processor is configured to transmit and receive data over a power line via the powerline transceiver, and wherein the processor is further configured to:
   receive a plurality of data via the powerline transceiver;
   determine a first signal strength of the first wireless transceiver;
   determine a second signal strength of the second wireless transceiver;
   compare the first signal strength and the second signal strength;
   determine whether to route the plurality of data through the first wireless transceiver or the second wireless transceiver based on the comparison; and
   transmit the plurality of data via one of the first wireless transceiver and the second wireless transceiver based on the determination.

2. The BPL master control unit in accordance with claim 1 further comprising a removable storage device in communication with the processor, and wherein the processor is further configured to:
   determine that the first signal strength and the second signal strength do not exceed a corresponding predetermined threshold; and
   store the plurality of data to the removable storage device.

3. The BPL master control unit in accordance with claim 1, wherein the first wireless transceiver is a Wi-Fi transceiver.

4. The BPL master control unit in accordance with claim 1, wherein the second wireless transceiver is a cellular modem.

5. The BPL master control unit in accordance with claim 1, wherein the processor is further configured to detect a BPL slave unit via the powerline transceiver.

6. The BPL master control unit in accordance with claim 5, wherein the BPL slave unit is aboard an aircraft and wherein the plurality of data is associated with the operation of the aircraft.

7. The BPL master control unit in accordance with claim 5, wherein the processor is further configured to:
   audit the voltage, current, and phase of the connection to the BPL slave unit; and
   determine whether or not to transmit the plurality of data based on the audit.

8. The BPL master control unit in accordance with claim 1, wherein the powerline transceiver is connected to a three-phase power line comprising a conductor associated with each respective phase.

9. A BPL slave unit comprising:
   a processor;
   a local memory device in communication with the processor;
   a removable storage device in communication with the processor; and
   a powerline transceiver in communication with the processor,
   wherein the processor is configured to transmit and receive data over a power line via the powerline transceiver, wherein the processor is in communication with a plurality of systems, and wherein the processor is further configured to:
     receive a plurality of data from the plurality of systems;
     determine whether or not the powerline transceiver is connected to a BPL master control unit;
     transmit, via the powerline transceiver, the plurality of data to the BPL master control unit if the powerline transceiver is connected to the BPL master control unit; and
     store, in the removable storage device, the plurality of data if the powerline transceiver is not connected to the BPL master control unit.

10. The BPL slave unit in accordance with claim 9, wherein the BPL slave unit is aboard an aircraft and wherein the plurality of systems is also aboard the aircraft.

11. The BPL slave unit in accordance with claim 10, wherein the processor is further configured to determine whether the aircraft is on the ground prior to determining whether or not the powerline transceiver is connected to the BPL master control unit.

12. The BPL slave unit in accordance with claim 9, wherein the processor is further configured to:
   store the plurality of data in the removable storage device; and
   transmit the plurality of data from the removable storage device to the BPL master control unit via the powerline transceiver.

13. The BPL slave unit in accordance with claim 9, wherein the processor is further configured to store the plurality of data in the removable storage device prior to connecting to the BPL master control unit.

14. The BPL slave unit in accordance with claim 9, wherein the processor is further configure to:
   in response to determining that the powerline transceiver is connected to a BPL master control unit, auditing the voltage, current, and phase of the connection to the BPL master control unit; and
   determining whether or not to transmit the plurality of data based on the audit.

15. A method for communicating via a BPL connection, the method implemented by a master control unit including a processor in communication with a memory, the method comprising:
   detecting, via the BPL connection, a connection to a slave unit;
   receiving, via the BPL connection, a plurality of data from the slave unit;
   determining a destination for the plurality of data;
   comparing two or more transmission methods for transmitting the plurality of data to the destination; and
   transmitting the plurality of data to the destination via one of the two or more transmission methods based on the comparison.

16. A method in accordance with claim 15, wherein the two or more transmission methods include a first wireless transmission method and a second wireless transmission method, and where the method further comprises:
   determining a first signal strength of the first wireless transmission method;
   determining a second signal strength of the second wireless transmission method;
   comparing the first signal strength and the second signal strength to determine which wireless transmission method to use; and
   transmitting the plurality of data via the determined wireless transmission method.

17. A method in accordance with claim 16 further comprising:
   comparing the first signal strength and the second signal strength to a corresponding predetermined threshold; and
   storing the plurality of data in a removable storage device if neither the first signal strength nor the second signal strength exceed the corresponding predetermined threshold.

18. A method in accordance with claim 17 further comprising:
   determining that a wireless connection via the determined wireless transmission method has stopped; and
   storing the plurality of data in the removable storage device.

19. A method in accordance with claim 15, wherein the slave unit is in communication with a plurality of computer systems, wherein the plurality of computer systems and the slave unit are aboard an aircraft, and wherein the slave unit receives the plurality of data from the plurality of computer systems, and wherein the method further comprises:
   receiving, by the master control unit via the determined wireless transmission method, a second plurality of data to be routed to the plurality of computer systems;

transmitting, to the slave unit, the second plurality of data; and routing, by the slave unit, the second plurality of data to one or more devices of the plurality of computer systems.

* * * * *